United States Patent [19]
Acernese et al.

[11] Patent Number: 5,972,216
[45] Date of Patent: Oct. 26, 1999

[54] PORTABLE MULTI-FUNCTIONAL MODULAR WATER FILTRATION UNIT

[75] Inventors: Primo L. Acernese, Allentown; James Novak, Jr., Emmaus, both of Pa.

[73] Assignee: Terra Group, Inc., Allentown, Pa.

[21] Appl. No.: 08/957,119

[22] Filed: Oct. 24, 1997

[51] Int. Cl.[6] .................................................. C02F 9/00
[52] U.S. Cl. .................. 210/253; 210/259; 210/266; 210/284
[58] Field of Search ..................... 210/241, 253, 210/257.2, 259, 260, 266, 503, 232, 284

[56] References Cited

U.S. PATENT DOCUMENTS

| | | | |
|---|---|---|---|
| 3,182,803 | 5/1965 | Chisholm | 210/266 |
| 3,420,709 | 1/1969 | Barrett et al. | 210/503 |
| 4,383,920 | 5/1983 | Muller et al. | 210/87 |
| 4,448,695 | 5/1984 | Gordon, Jr. et al. | 210/694 |
| 4,642,192 | 2/1987 | Heskett | 210/638 |
| 4,659,460 | 4/1987 | Muller et al. | 210/241 |
| 5,059,317 | 10/1991 | Marius et al. | 210/266 |
| 5,122,274 | 6/1992 | Heskett | 210/638 |
| 5,135,654 | 8/1992 | Heskett | 210/638 |
| 5,198,118 | 3/1993 | Heskett | 210/638 |
| 5,244,579 | 9/1993 | Horner et al. | 210/652 |
| 5,269,932 | 12/1993 | Heskett | 210/638 |
| 5,300,224 | 4/1994 | Farley | 210/266 |
| 5,415,770 | 5/1995 | Heskett | 210/202 |
| 5,547,584 | 8/1996 | Capehart | 210/669 |
| 5,632,892 | 5/1997 | Klein | 210/257.2 |

*Primary Examiner*—Ivars Cintins
*Attorney, Agent, or Firm*—Duane, Morris & Heckscher LLP

[57] ABSTRACT

A portable multi-functional modular water filtration unit having configurable modules that can be adapted to render environmental water potable or to isolate contaminants from groundwater or water from other sources such as backwash from reverse osmosis water purification units (ROWPU) or shower and laundry water ("gray water") such that the water may be recycled or discharged in full compliance with applicable laws. Plural treatment tanks as well as inlet and outlet filters are coupleable via pressure gauge bearing quick connect fittings in series and parallel arrangements, to allow changes of filter elements (for replacement or substitution of a different active material) and to accommodate flow in filtration arrays. The water purification system specifically addresses the changing water purifying needs that arise during troop deployment, training and maneuvers, disaster relief and environmental cleanup.

17 Claims, 6 Drawing Sheets

PORTABLE MULTI-FUNCTIONAL MODULAR WATER FILTRATION UNIT

FIELD OF THE INVENTION

The invention relates to the field of water purification, and in particular concerns a modular mobile water purification system for use by military forces in the field. The water purification system includes a portable multi-functional filtration unit having configurable modules that can be adapted to render environmental water potable or to isolate contaminants from groundwater or water from other sources such as backwash from reverse osmosis water purification units (ROWPU). The invention permits safe environmental discharge of a large proportion of treated water and substantially decreases the need to truck contaminated water for treatment.

BACKGROUND OF THE INVENTION

A large amount of the natural water on the Earth is sea water or brackish water that is not suitable for human consumption due to the presence of salts and sediments. So-called fresh water may likewise be unsuitable for human consumption, for example containing deleterious compounds, bacteria or other microorganisms. Furthermore, groundwater can become polluted by the actions of man. In such instances it is known to treat the water by filtration and chemical treatment steps.

Filtration involves passing water through a filter medium that stops pollutants and passes pure water. The filter medium must be cleaned or replaced when its capacity is met. A highly effective mobile filtration apparatus used by the military is the reverse osmosis water purification unit or "ROWPU."

Reverse osmosis is a method that effects the separation of solutes from a solution by causing the solvent to float through a membrane at pressures higher than the normal osmotic pressure. This is possible because of the phenomenon of osmosis. Osmosis is a phenomenon manifested by the diffusion of a solvent (such as water) through a semipermeable membrane from an area of greater osmotic pressure (i.e., greater concentration of dissolved substance) to an area of lower osmotic pressure (i.e., lesser concentration of dissolved substance). In reverse osmosis, the solvent diffuses through a membrane filter leaving dissolved substances, such as salts and other contaminants, behind.

Reverse osmosis purification equipment is readily sized for a particular application simply by providing the requisite area of membrane and a suitable pump. Therefore, reverse osmosis purification units are ideally suited for use at remote sites, and are conveniently transported on trucks or trailers.

These units are available in various capacities and typically are carried on trucks having such pumps and conduits as necessary to filter water from available sources. In this apparatus, water is forced through a membrane that passes pure water and concentrates pollutants in the water on the upstream side of the membrane. In addition, it is periodically necessary to flush or backwash the ROWPU filtration membranes to release collected contaminants from the membrane. As the concentration of the contaminants in the raw water increases to a given limit, the throughput through the ROWPU decreases for a given pump head pressure. Also, the membrane may become caked with contaminants on the high pressure side.

As a byproduct of filtration and/or backwashing, the water on the upstream side of the membrane, known as "brine," carries a higher concentration of contaminants than the source water. Depending on the time used and the extent of contaminants in the source water, the concentration of contaminants in the brine or backwash can be sufficient to render the water unfit for discharge into natural watercourses, which could become polluted. As a result, part of the water carrying capacity of a mobile military unit is devoted to transporting brine and backwash to municipal or similar fixed installations for water treatment.

Conventionally, during military operations, the backwash is captured in hard walled water tankers. Once one tanker is filled, the composition of its contents are determined via well known analytical methods. The contents of the tanker are then chemically treated. The tanker's contents are analyzed a second time. This process continues until the contents in the tanker are brought into compliance with EPA limits for sewer system disposal. Once in compliance, the contents are taken to a sanitation disposal site and discharged. The process of collecting and transporting brine and backwash, and treating and safely discharging it, requires the commitment of time and equipment. For example, it is conceivable that several tankers may need to be staged and available for collection and transport functions, each having at least one associated person on duty, in order to support the continuous operation of a ROWPU. What is needed is a multi-functional modular water filtration unit that can be adapted to treat different brine compositions, and which can be used in the field to render brine and backwash sufficiently pure to be discharged in the same area where the source water was collected, or at least to meet the minimum environmental protection standards for discharge into municipal sewage systems. By treating the brine and backwash in the field, the present invention eliminates the costs of batch hauling and discharge fees associated with conventional means of treatment, reduces the risks of spillage and substantially decreases the man hour and equipment requirements associated with conventional treatment means.

The multi-functional modular water filtration unit as described herein may be easily interfaced to optimize throughput capacity versus extent of filtration, using parallel and serial configurations of filtration elements interconnected by reconfigurable fittings. in a similar manner, the filtration media can be conveniently and effectively modified to facilitate operation in a variety of circumstances and for different specific pollutants. In a preferred arrangement, a modular brine/backwash filtration unit coupled to a ROWPU can be configured using the filtration elements to treat backwash from an ROWPU sourced by a natural watercourse or municipal supply; to treat sanitary waste water from showers, laundry facilities and the like; to treat water potentially containing nuclear or biological contaminants; to remove chemical contaminants such as fuels; and to pretreat municipal source water supplies, for example to eliminate chlorine that tends to damage reverse osmosis membranes.

SUMMARY OF THE INVENTION

For these purposes, a portable multi-functional modular water filtration unit is provided with a rigid frame; a particulate removal element attached to the rigid frame; a bank of water purifying tanks removably secured to the rigid frame; a final filtration element attached to the rigid frame; a unit inlet means adapted to connect the filtration unit to a source of raw water; a unit outlet means adapted to deliver filtered water; and, a system of quick-connect interconnection means adapted to connect the particulate removal element, the water purifying tanks and the final filtration element, wherein the water purifying tanks may be selectively connected to one another in at least one of series, parallel, and combinations thereof.

It is an object of the invention to provide a water filtration unit which is portable and easily transported to remote locations wherever troops may be deployed.

It is another object of the invention to provide a water filtration unit which is modular in design such that multiple units may easily be arrayed together to satisfy the capacity requirements for a given application.

It is another object of the invention to provide a water filtration unit which is very flexibly reconfigurable and which easily may be modified to filter from the raw water a wide variety of different contaminants including nuclear, biological and chemical compositions.

It is another object of the invention to provide a water filtration unit comprising a bank of water purifying tanks wherein the bank may quickly and easily be removed from the unit and replaced with a fresh bank.

It is another object of the invention to provide a water filtration unit wherein the unit may quickly and easily be modified to accommodate changes in the contaminant composition in the raw water fed to the unit.

It is another object of the invention to provide a water filtration unit comprising a bank of water purifying tanks wherein the water purifying tanks may selectively be filled with treatment materials selected from the group comprising anion exchange resins; cation exchange resins; mixed anion and cation exchange resins; sand; activated carbon; scavenging resins; hydrocarbon absorbing bentonite compounds; metals and metal alloys in granular and reticulated form; and mixtures of ceramic, polymeric and metallic materials in granular, powder and reticulated form.

It is another object of the invention to provide a water filtration unit comprising a bank of water purifying tanks wherein at least half of the water purifying tanks are filled with research grade granular activated carbon impregnated with absorbents.

It is another object of the invention to provide a water filtration unit comprising a bank of water purifying tanks wherein the water purifying tanks are coupled together using a system of quick-connect interconnection means comprising a series of U-shaped end fittings to form a flowpath through the filtration unit; wherein the flowpath may be selectively modified to connect the water purifying tanks in at least one of series, parallel and any combination thereof.

It is another object of the invention to provide a water treatment system, comprising a reverse osmosis water purification unit in combination with a portable multi-functional modular water filtration unit for treatment of backwash from the reverse osmosis water purification unit, wherein the filtration unit includes a rigid frame; a particulate removal element attached to the rigid frame; a bank of water purifying tanks removably secured to the rigid frame; a final filtration element attached to the rigid frame; a unit inlet means adapted to connect the filtration unit to a source of raw water; a unit outlet means adapted to deliver sewer system disposable water from the filtration unit; and, a system of quick-connect interconnection means adapted to connect the particulate removal element, the water purifying tanks and the final filtration element, wherein the water purifying tanks may be selectively connected to one another in at least one of series, parallel, and any combination thereof.

It is another object of the invention to provide a convenient modular means by which brine and backwash waste water produced by a mobile reverse osmosis water purification unit can be continuously decontaminated for discharge on site without substantial storage or transport.

One aspect of the invention resides in a portable multi-functional modular water filtration unit, including a rigid frame; a particulate removal element attached to the rigid frame; a bank of water purifying tanks removably secured to the rigid frame; a final filtration element attached to the rigid frame; a unit inlet means adapted to connect the filtration unit to a source of raw water; a unit outlet means adapted to deliver filtered water; and, a system of quick-connect interconnection means adapted to connect the particulate removal element, the water purifying tanks and the final filtration element, wherein the water purifying tanks may be selectively connected to one another in at least one of series, parallel, and any combination thereof.

Another aspect of the invention resides in a water treatment system, comprising a reverse osmosis water purification unit in combination with a portable multi-functional modular water filtration unit for treatment of backwash from the reverse osmosis water purification unit, wherein the filtration unit comprises a rigid frame; a particulate removal element attached to the rigid frame; a bank of water purifying tanks removably secured to the rigid frame; a final filtration element attached to the rigid frame; a unit inlet means adapted to connect the filtration unit to a source of raw water; a unit outlet means adapted to deliver sewer system disposable water from the filtration unit; and, a system of quick-connect interconnection means adapted to connect the particulate removal element, the water purifying tanks and the final filtration element, wherein the water purifying tanks may be selectively connected to one another in at least one of series, parallel, and any combination thereof.

These and other advantages of the invention will become more apparent in connection with the following description of certain embodiments of the invention as disclosed in non-limiting examples.

BRIEF DESCRIPTION OF THE DRAWINGS

There are shown in the drawings the embodiments of the invention as presently preferred. It should be understood that the invention is capable of embodiment in a number of specific arrangements in accordance with the disclosure herein, and reference should be made to the appended claims rather than discussion of exemplary embodiments to assess the scope of the invention in which exclusive rights are claimed. In the drawings:

DETAILED DESCRIPTION OF THE PREFERRED EMBODIMENTS OF THE INVENTION

A portable multi-functional modular water filtration unit according to the invention has a rigid frame; a particulate removal element attached to the rigid frame; a bank of water purifying tanks removably secured to the rigid frame; a final filtration element attached to the rigid frame; a unit inlet means adapted to connect the filtration unit to a source of raw water; a unit outlet means adapted to deliver filtered water; and, a system of quick-connect interconnection means adapted to connect the particulate removal element, the water purifying tanks and the final filtration element, wherein the water purifying tanks may be selectively connected to one another in at least one of series, parallel, and any combination thereof.

The portable multi-functional modular water filtration unit of the invention is preferably compact and portable so that it may be transported and used virtually anywhere. Most preferably, the water filtration units of the invention fits within a volume of approximately 2.0×0.5×1.0 m. The compact portability of the water filtration units of the invention is required so that the units will be versatile enough to satisfy the variety of operating situations that may arise during military operations, disaster relief efforts, treatment of water collected at remote spill sites and other situations in which mobile water treatment is advantageously deployed. Moreover, this is accomplished in a manner that reduces or eliminates the need to transport containers of waste water and other filtration products to and from the site by purifying such waste water to the point that it can be openly discharged without environmental damage.

The portable multi-functional modular water filtration units of the invention are designed to be coupleable with one another in series and/or parallel configurations to form filtration arrays. At least two units can be coupled in parallel to facilitate higher flow rates or in series to facilitate additional filtration processes. In particular, the rigid frames comprising the water filtration units have fittings that are coupleable in a complementary manner for interfacing multiple units into a filtration array.

The portable multi-functional modular water filtration units of the invention comprise a bank of water purifying tanks. Each bank may comprise two or more individual water purifying tanks. Each water purifying tank contains a treatment material for removing or filtering contaminants from the water passing through the unit. The specific treatment material used is dependent upon the contaminants present in the water to be treated, examples being discussed below. The respective purifying tanks in the bank may contain a different treatment material or serially coupled tanks can contain like material for increasing exposure of the water to such material. The treatment materials used may be selected from the group comprising anion exchange resins; cation exchange resins; mixed anion and cation exchange resins; sand; activated carbon; scavenging resins; hydrocarbon absorbing bentonite compounds; metals and metal alloys in granular and reticulated form; and mixtures of ceramic, polymeric and metallic materials in granular, powder and reticulated form. At least half of the water purification tanks in the bank can be filled with research grade granular activated carbon impregnated with absorbents such as cationic and anionic absorbents.

The portable multi-functional modular water filtration units of the invention are designed so that the bank of water purifying tanks are removably secured to the rigid frame. Particularly, the bank may be secured to the rigid frame using containment bars which themselves have quick connect attachments to the rigid frame. This design enables the rapid removal and replacement of the bank. This feature is critical for two reasons: (1) it allows a spent bank (a bank wherein the treatment materials in the water purifying tanks are in need of replacement or recharge) to be replaced with a fresh bank in a very short period of time; and (2) it allows a bank designed to remove, for example, chemical contaminants to be quickly replaced with a bank that, for example, removes radioactive contaminants. Hence, the water filtration unit design of the invention allows for a spent bank to be replaced with minimal downtime. The water filtration unit design of the invention also allows for rapid adjustments which may be necessitated by changes in the quality of the raw water feed to the unit.

The water filtration units of the invention are multi-functional because the water purifying tanks in the bank may be filled with a variety of treatment materials. Accordingly, the water filtration units of the invention may be used for the reduction and removal of, for example: total suspended solids (TSS); biological oxygen demand (BOD) materials; chemical oxygen demand (COD) compositions; oil and grease removal; extraction of benzene, toluene, ethelbenzene, xylene (BTEX); heavy metals; volatile organic compounds (VOC); total organic carbon (TOC); nuclear, biological and chemical contaminants (NBC); phosphates and detergents; chlorine and chlorinated compounds; trihalomethanes (THM); nitrates; and, herbicides and pesticides. Hence, the water filtration units of the invention are very versatile and may be used in military deployment and disaster relief efforts or in cleanups, for a variety of water treatment applications.

The water purifying tanks within the bank in the water treatment units of the invention are interconnected using U-shaped end fittings and manifolds. The water purifying tanks are equally spaced within the bank and have access openings on top and on the side close to the bottom. The U-shaped end fittings are used to interconnect the tops of the water purifying tanks. The manifolds may be used to interconnect the sides of the water purifying tanks. Alternatively, the sides of the water purifying tanks may be interconnected using U-shaped end fittings. Using these interconnection methods a variety of flowpaths through the bank are possible. The flow path may be short or tortuous depending upon the type and quantity of contaminants in the raw water which must be removed by the water filtration unit and upon the desired water flow rate.

The U-shaped end fittings may preferably include pressure gauges to facilitate process troubleshooting in the event of a system upset and to signal when the bank is spent and needs to be changed out with a fresh bank. According to an inventive aspect, quick connect couplings that attach between adjacent tanks along a flow path of the water are each provided with a pressure gauge, the different pressures on opposite sides of the tanks representing back pressure and flow resistance. By monitoring the pressure drops from one gauge to the next, the operator can readily monitor the extent to which particular filter elements are clogged and/or spent.

The unit inlet means adapted to connect the filtration unit to a source of raw water preferably comprises standard 2" CAMLOCK fittings which may readily connect to standard military water treatment and distribution equipment. Likewise, the unit outlet means adapted to deliver filtered water preferably comprises standard 2" CAMLOCK fittings.

The particulate removal element is designed to remove particulates from the water before the water is introduced into the bank. The particulate removal element may comprise conventional backflushable filter elements, screens, strainers or bag filters. Preferably, the particulate removal element will remove particulates above 5 microns.

The final filtration element is designed to filter out any particulate materials above 25 microns. The final filtration element may comprise a housing containing granular activated carbon block or porous extruded carbon block, or activated carbon and resins.

Figure 1:
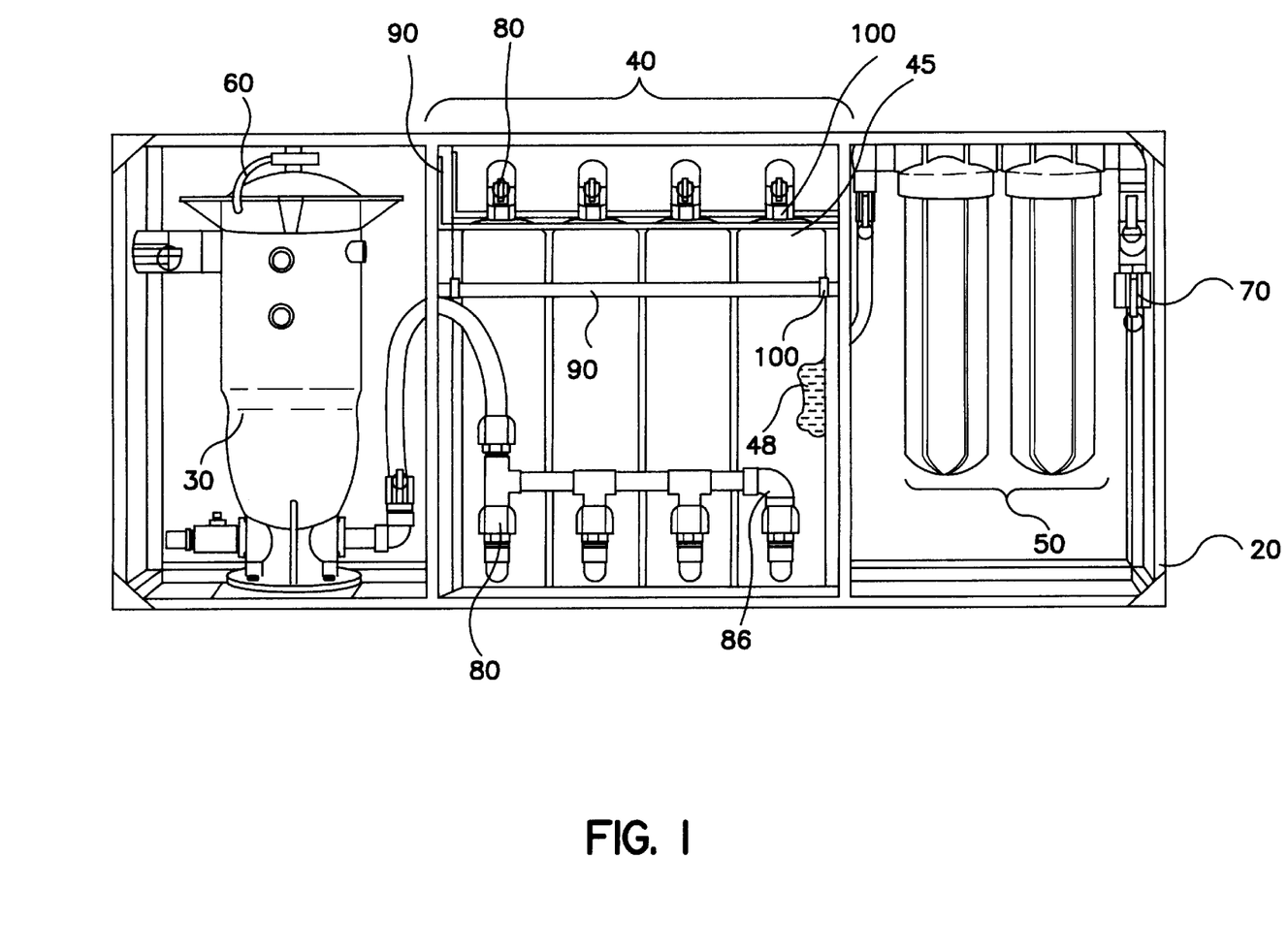
FIG. 1 is a front plan view of a preferred portable multi-functional modular water filtration unit of the invention.

Referring to FIG. 1, an exemplary portable multi-functional water filtration unit 10 is shown. The water filtration unit 10, comprises a rigid frame 20; a particulate removal element 30 attached to the rigid frame 20; a bank 40 of water purifying tanks 45 containing treatment material 48 removably secured to the rigid frame 20; a final filtration element 50 attached to the rigid frame 20; a unit inlet means 60 adapted to connect the filtration unit 10 to a source of raw water; a unit outlet means 70 adapted to deliver filtered water; and, a system of quick-connect interconnection means 80 adapted to connect the particulate removal element 30, the water purifying tanks 45 and the final filtration element 50, wherein the water purifying tanks may be selectively connected to one another in at least one of series, parallel, and any combination thereof.

In FIG. 1, the bank is removably secured to the frame 20 with containment bars 90. Which containment bars 90 are attached to the frame 20 using quick-release means 100. More particularly, the quick-release means 100 may preferably comprise, for example, wing nuts and bolts, and quick-release ring pins.

Figure 2:
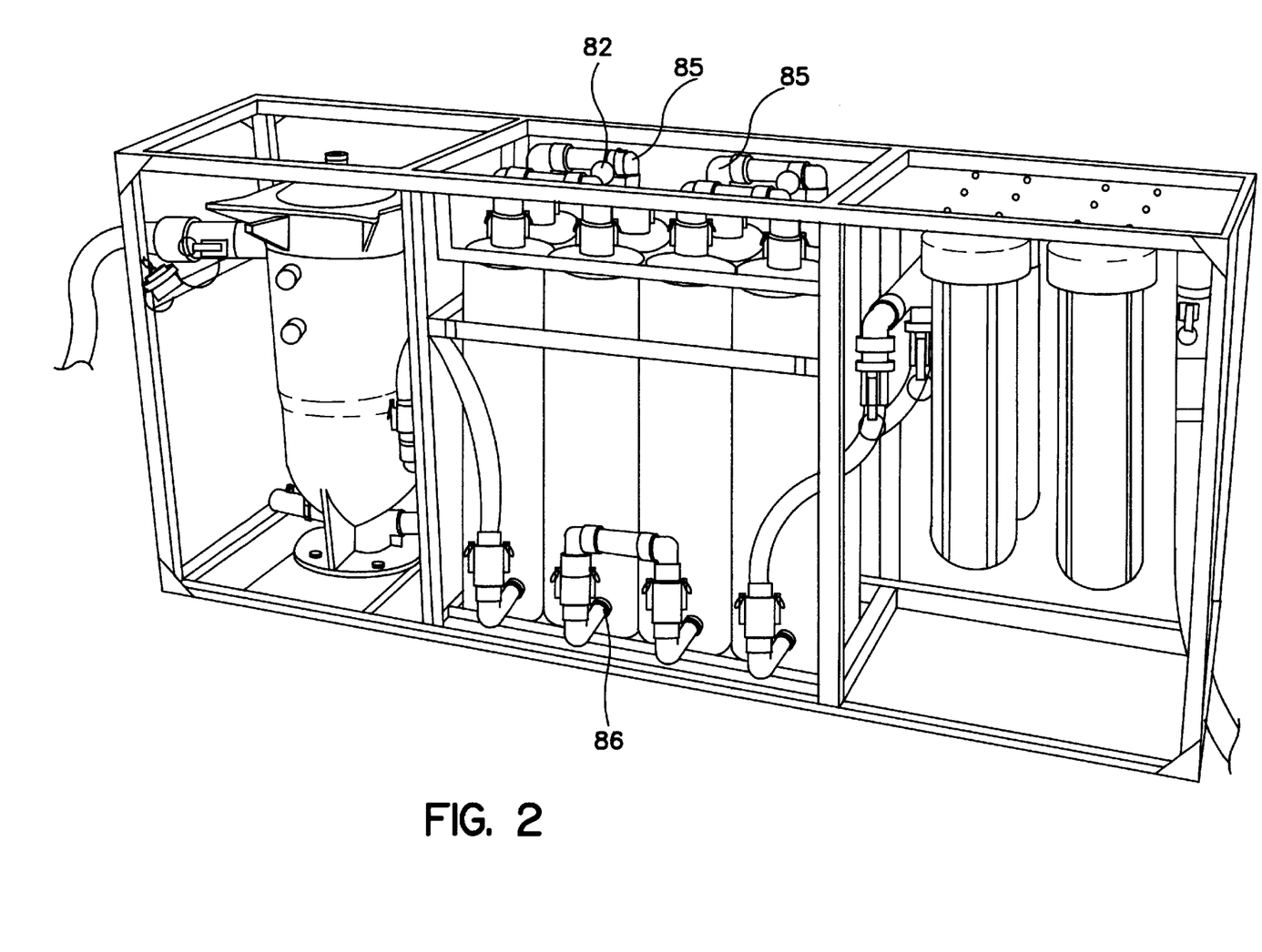
FIG. 2 is a front elevational view of the water filtration unit shown in FIG. 1.

The system quick-connect interconnection means 80 preferably comprises a combination of U-shaped connectors 85 and bottom manifolds 86 (shown in FIG. 1 as a bottom four-way manifold and in FIG. 2 as a two-way manifold). The system quick-connect interconnection means 80 may also simply comprise U-shaped connectors, see FIG. 2. Also, shown in FIG. 2 are optional pressure gauges 82.

Figure 3:
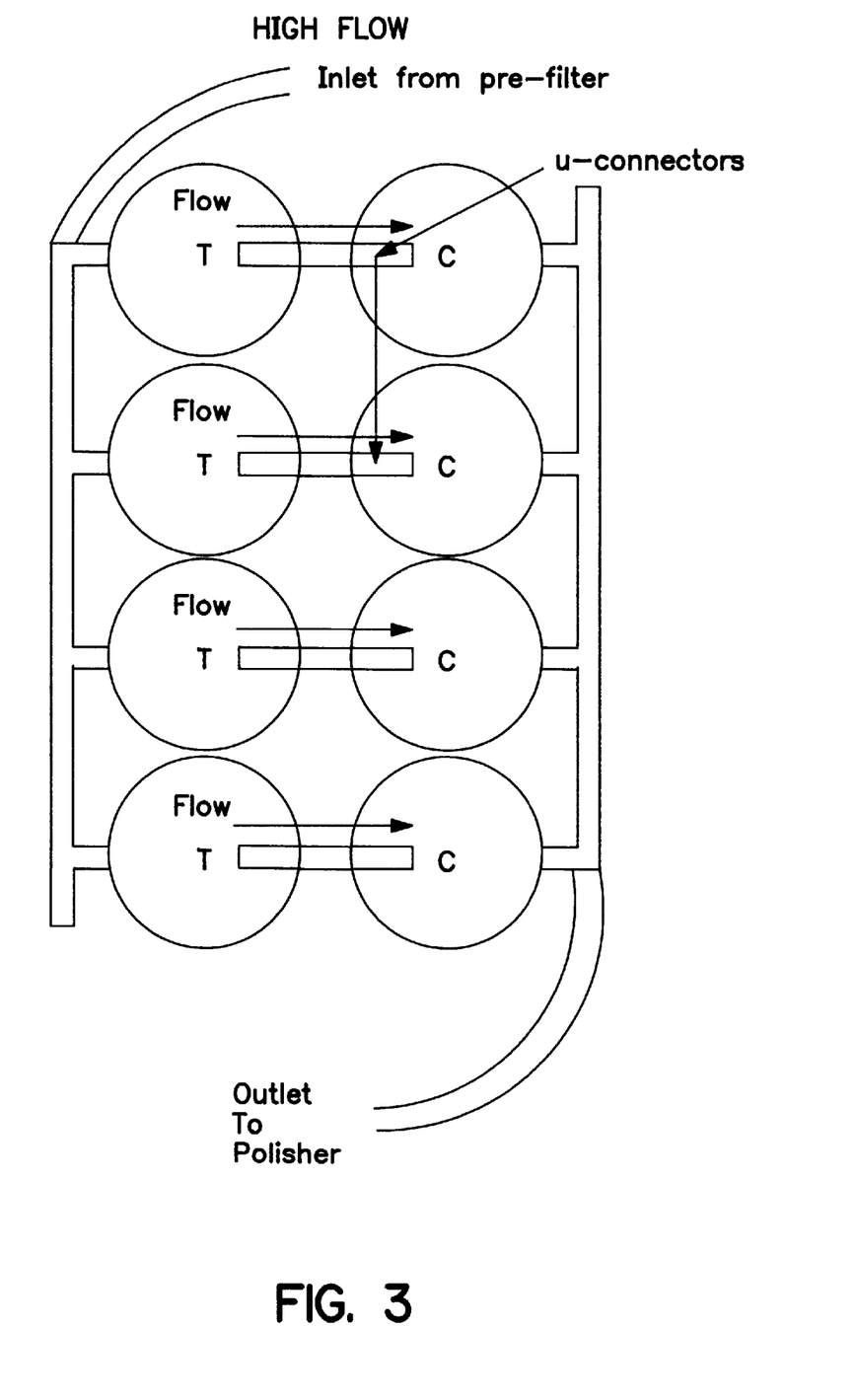
FIG. 3 is a schematic showing one interconnection scheme for the water purifying tanks in an eight tank bank.
Figure 4:
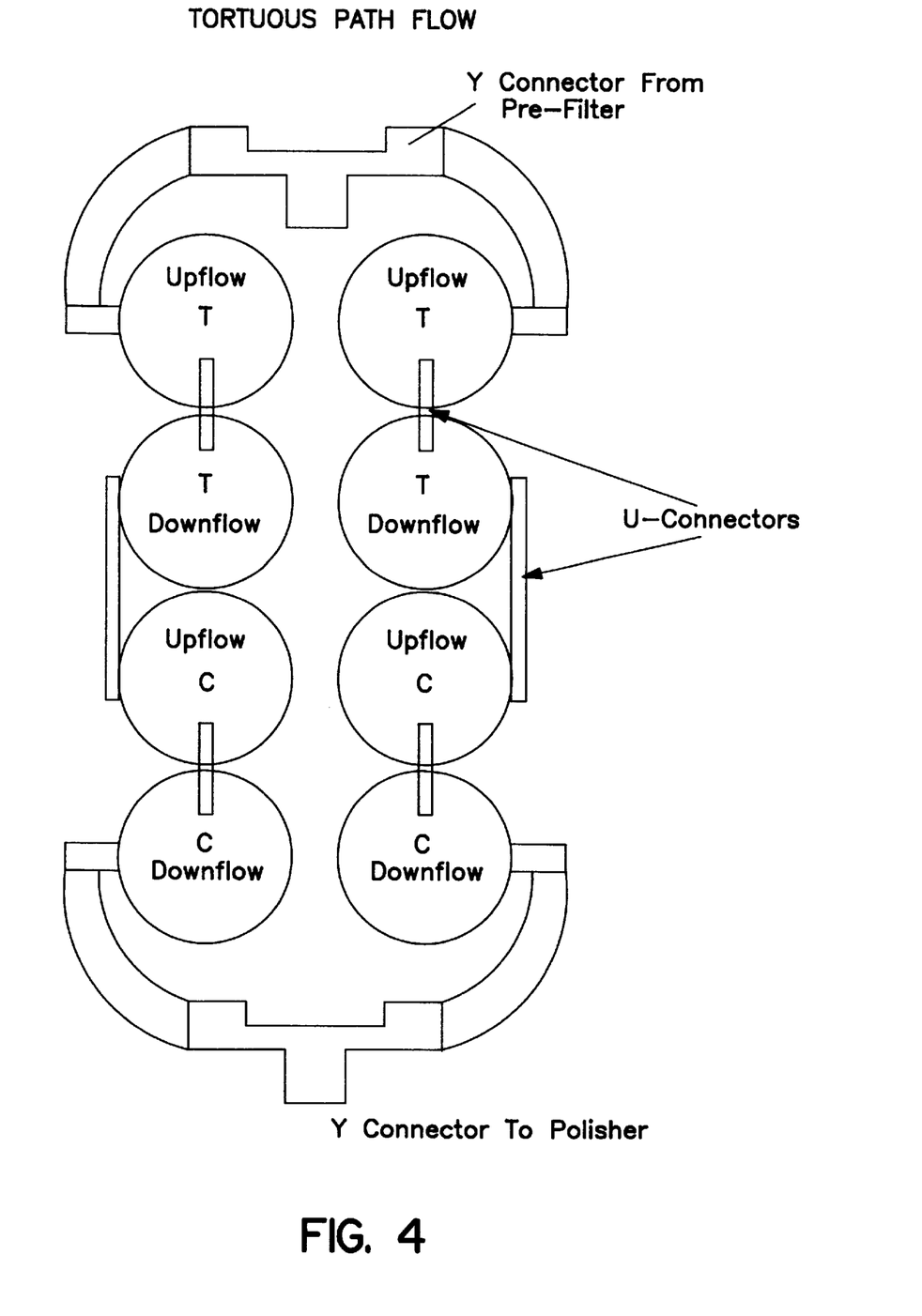
FIG. 4 is a schematic showing another interconnection scheme for the water purifying tanks in an eight tank bank.

The arrangement of the quick-connect interconnection means 80 allows for a multiplicity of arrangements for the interconnection of the water purifying tanks in the bank. For example, FIG. 3 shows a high flow arrangement for the interconnection such that the water being treated must pass through two water purifying tanks with four pairs of water purifying tanks connected in parallel. FIG. 4 shows an alternative flow arrangement setting up a tortuous path wherein the water must flow through four water purifying tanks with two sets of four water purifying tanks connected in parallel.

Figure 5:
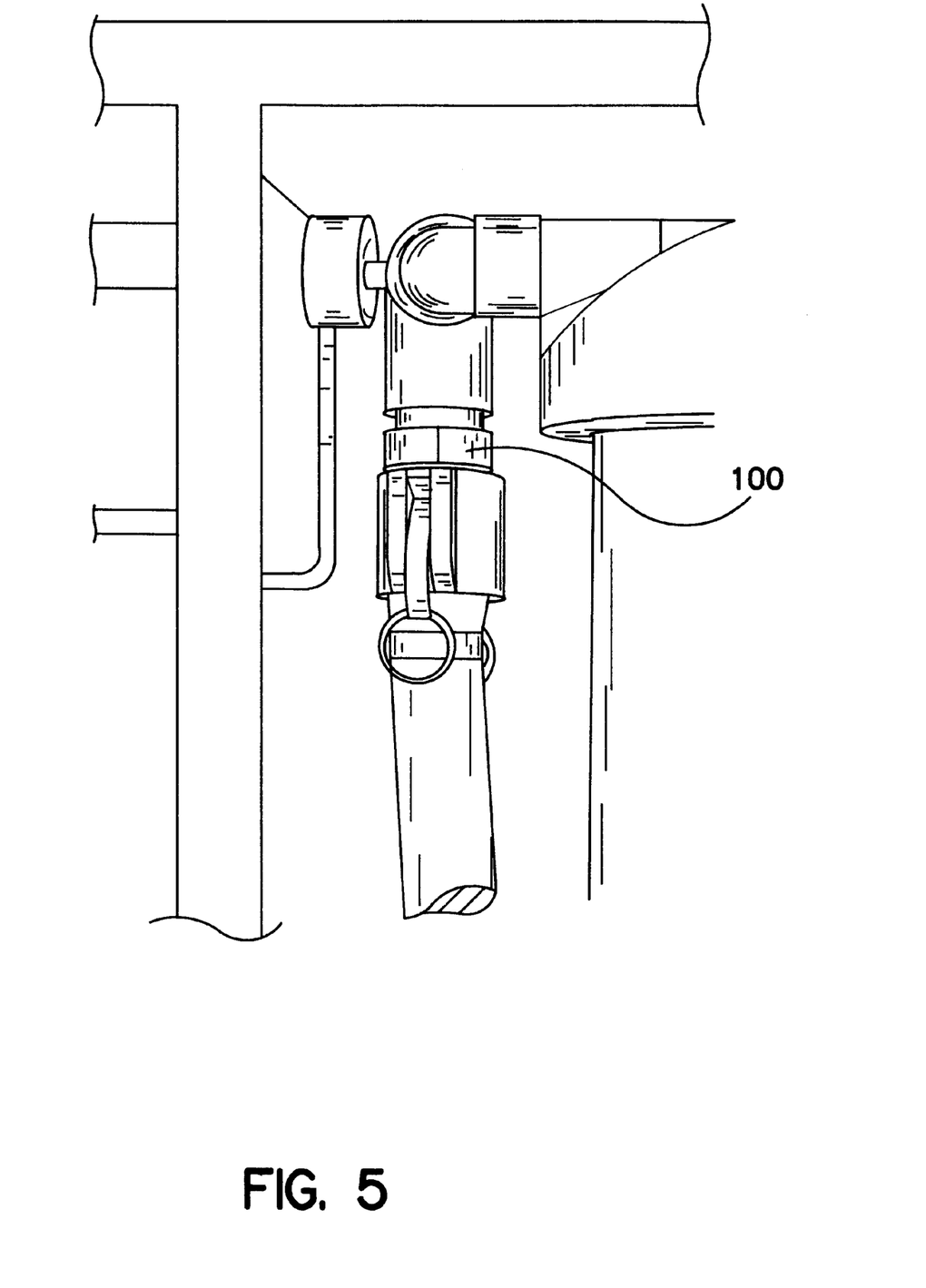
FIG. 5 is a plan view of a connection means for use with the invention.

The unit inlet means and unit outlet means preferably comprise 2" CAMLOCK connectors 100, see FIG. 5.

The instant invention is now illustrated by way of example, which are intended to be purely exemplary and not limiting.

EXAMPLE 1

Figure 6:
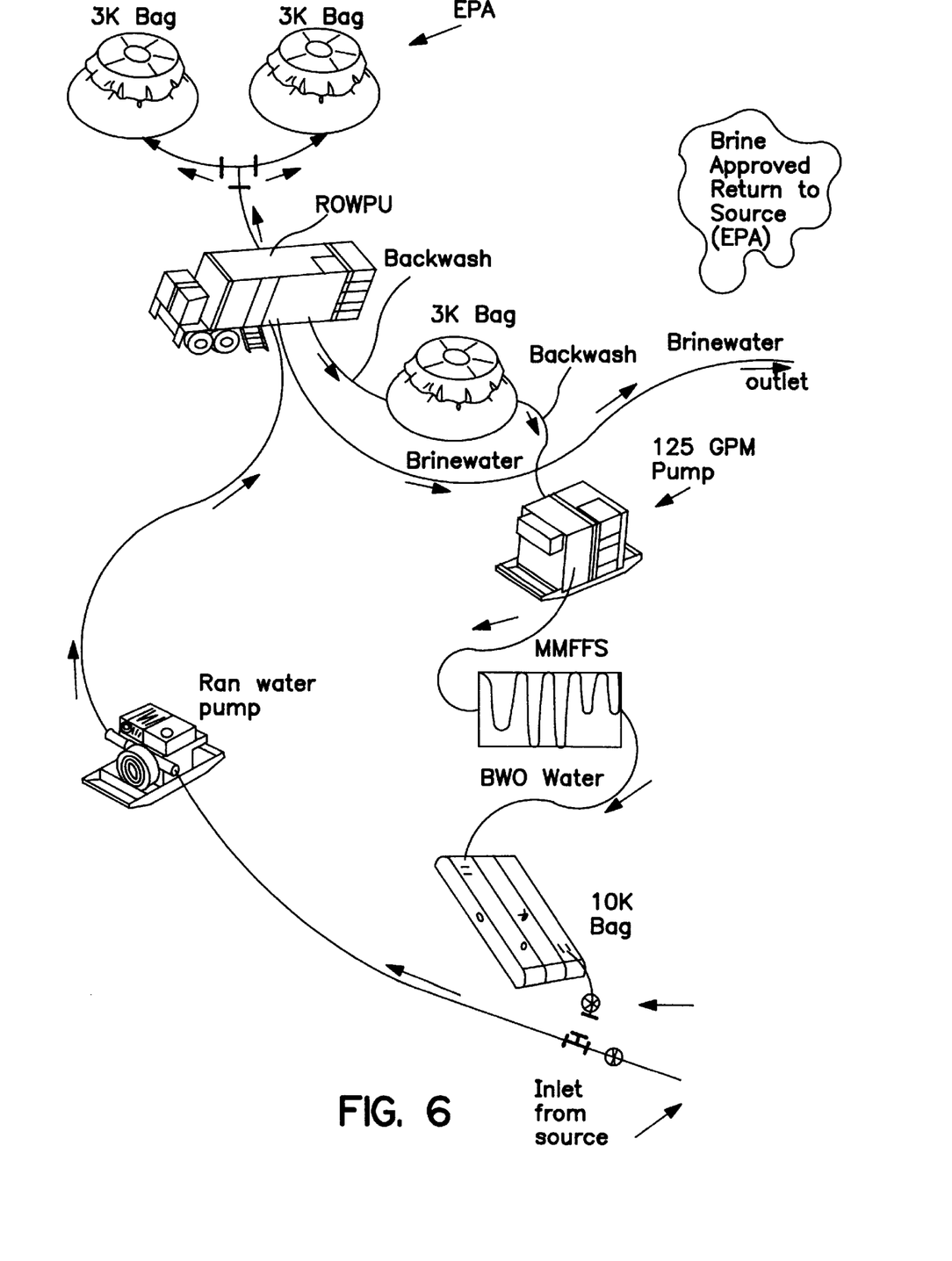
FIG. 6 is a depiction of a preferable water treatment system comprising a ROWPU in combination with a portable multi-functional modular water filtration unit of the invention.

A portable multi-functional modular water filtration unit of the invention was used in combination with an ROWPU to treat JP-8 (Jet fuel) contaminated water at Roving Sands, a military petroleum operation. FIG. 6 is a depiction of the water treatment system used, wherein the portable multi-functional modular water filtration unit was used to treat the backwash from the ROWPU. The portable multi-functional modular water filtration unit used comprised a pre-filter bag filter; eight water purification tanks containing mixtures of bentonites, clays and activated carbon, connected in series/ parallel tortuous path; and a final filtration element containing research grade activated carbon. The water discharged from the portable multi-functional modular water filtration unit was subjected to analytical testing using carbon-link scan. The results of analytical tests performed on water prior to, and following, treatment with the portable multi-functional modular water filtration unit of the invention are presented in table 1, below. The backwash water, subsequent to treatment by the portable multi-functional modular water filtration unit satisfied EPA limits for sewer system disposal.

TABLE 1

| Scanned for | Result | Units |
|---|---|---|
| SAMPLE PRIOR TO TREATMENT | | |
| $C_7$–$C_8$ | ND (not detectable) | mg/L |
| $C_9$–$C_{10}$ | 120 | mg/L |
| $C_{11}$–$C_{12}$ | ND | mg/L |
| $C_{13}$–$C_{14}$ | ND | mg/L |
| $C_{15}$–$C_{16}$ | ND | mg/L |
| $C_{17}$–$C_{18}$ | ND | mg/L |
| $C_{19}$–$C_{20}$ | ND | mg/L |
| $C_{21}$–$C_{22}$ | ND | mg/L |
| $C_{23}$–$C_{24}$ | ND | mg/L |
| $C_{25}$–$C_{26}$ | ND | mg/L |
| Est. > $C_{26}$ | ND | mg/L |
| SAMPLE POST TREATMENT | | |
| $C_7$–$C_8$ | ND | mg/L |
| $C_9$–$C_{10}$ | ND | mg/L |
| $C_{11}$–$C_{12}$ | ND | mg/L |
| $C_{13}$–$C_{14}$ | ND | mg/L |
| $C_{15}$–$C_{16}$ | ND | mg/L |
| $C_{17}$–$C_{18}$ | ND | mg/L |
| $C_{19}$–$C_{20}$ | ND | mg/L |
| $C_{21}$–$C_{22}$ | ND | mg/L |
| $C_{23}$–$C_{24}$ | ND | mg/L |
| $C_{25}$–$C_{26}$ | ND | mg/L |
| Est. > $C_{26}$ | ND | mg/L |

The invention having been disclosed in connection with the foregoing embodiments, additional embodiments will now be apparent to persons skilled in the art. The invention is not intended to be limited to the embodiments specifically mentioned, and accordingly reference should be made to the appended claims rather than the foregoing discussion, to assess the spirit and scope of the invention in which exclusive rights are claimed.

What is claimed is:

1. A portable multi-functional modular water filtration unit, comprising:
    (a) a rigid frame;
    (b) a particulate removal element attached to the rigid frame;
    (c) a bank of water purifying tanks, each tank containing a treatment material, removably secured to the rigid frame;
    (d) a final filtration element attached to the rigid frame;
    (e) a unit inlet means adapted to connect the filtration unit to a source of raw water;
    (f) a unit outlet means adapted to deliver filtered water from the filtration unit; and,
    (g) a system of quick-connect interconnection means adapted to connect the particulate removal element, the water purifying tanks and the final filtration element, wherein the water purifying tanks may be selectively connected to one another in at least one of series, parallel, and any combination thereof, wherein the system of quick-connect interconnection means comprise a series of U-shaped end fittings; and wherein the water purifying tanks are equally spaced in an array such that different pairs of water purifying tanks can alternatively be coupled to chance a flowpath through the filtration unit using the U-shaped end fittings.

2. The filtration unit of claim 1, wherein the rigid frame has means for securing individual filtration units together to form a filtration array.

3. The filtration unit of claim 1, wherein the water purifying tanks in the bank contain different treatment materials.

4. The filtration unit of claim 1, wherein the treatment materials are selected from the group consisting of anion exchange resins; cation exchange resins; mixed anion and cation exchange resins; sand; activated carbon; scavenging resins; hydrocarbon absorbing bentonite compounds; metals and metal alloys in granular and reticulated form; and mixtures of ceramic, polymeric and metallic materials in granular, powder and reticulated form.

5. The filtration unit of claim 1, wherein the water purifying tanks are pre-filled with water treatment materials.

6. The filtration unit of claim 1, wherein the water purifying tanks are secured to the rigid frame using quick connect fasteners to facilitate rapid replacement of the bank.

7. The filtration unit of claim 1, wherein at least half of the water purifying tanks in the bank are filled with research grade granular activated carbon impregnated with absorbents.

8. The filtration unit of claim 1, wherein the system of quick-connect interconnection means further comprises a bottom manifold interconnecting the water purifying tanks.

9. The filtration unit of claim 8, wherein the U-shaped end fittings and the bottom manifold are attachable to the water purifying tanks by quick disconnect fittings.

10. The filtration unit of claim 1, wherein the particulate removal element comprises a particulate filter element.

11. The filtration unit of claim 1, wherein the bank comprises eight water purifying tanks.

12. A water treatment system, comprising a reverse osmosis water purification unit in combination with a portable multi-functional modular water filtration unit for treatment of backwash from the reverse osmosis water purification unit, wherein the filtration unit comprises:

(a) a rigid frame;
   (b) a particulate removal element attached to the rigid frame;
   (c) a bank of water purifying tanks, each tank containing a treatment material, removably secured to the rigid frame;
   (d) a final filtration element attached to the rigid frame;
   (e) a unit inlet means adapted to connect the filtration unit to a source of raw water;
   (f) a unit outlet means adapted to deliver sewer system disposable water from the filtration unit; and,
   (g) a system of quick-connect interconnection means adapted to connect the particulate removal element, the water purifying tanks and the final filtration element, wherein the water purifying tanks may be selectively connected to one another in at least one of series, parallel, and any combination thereof, wherein the system of quick-connect interconnection means comprise a series of U-shaped end fittings; and wherein the water purifying tanks are equally spaced in an array such that different pairs of water purifying tanks can alternatively be coupled to change a flowpath through the filtration unit using the U-shaped end fittings.

13. The water treatment system of claim 12, wherein the rigid frame has means for securing individual filtration units together to form a filtration array.

14. The filtration unit of claim 12, wherein the water purifying tanks contain different treatment materials.

15. The filtration unit of claim 12, wherein the treatment materials are selected from the group consisting of anion exchange resins; cation exchange resins; mixed anion and cation exchange resins; sand; activated carbon; scavenging resins; hydrocarbon absorbing bentonite compounds; metals and metal alloys in granular and reticulated form; and mixtures of ceramic, polymeric and metallic materials in granular, powder and reticulated form.

16. The filtration unit of claim 12, wherein the bank of water purifying tanks is secured to the rigid frame using quick fasteners to facilitate rapid replacement of the bank.

17. The filtration unit of claim 12, wherein at least half of the water purifying tanks in the bank are filled with research grade granular activated carbon impregnated with absorbents selected from the group consisting of cationic and anionic absorbents.

* * * * *